United States Patent [19]

Gremillet

[11] Patent Number: 4,499,568
[45] Date of Patent: Feb. 12, 1985

[54] PROCESS FOR THE TELEDISTRIBUTION OF RECORDED INFORMATION AND A SYSTEM FOR PERFORMING THIS PROCESS

[76] Inventor: Jacques Gremillet, 2, route de Choisel, 78460 Chevreuse, France

[21] Appl. No.: 449,199

[22] Filed: Dec. 13, 1982

[30] Foreign Application Priority Data

Dec. 16, 1981 [FR] France .................. 81 23518

[51] Int. Cl.³ .............. G11B 15/02; H04M 17/02; H04Q 9/00
[52] U.S. Cl. ................ 369/30; 179/6.3 MA; 358/85; 358/115; 369/6; 369/24; 369/29
[58] Field of Search .............. 179/6.01, 6.3 MA; 369/6, 24, 29, 30; 358/85, 114, 115, 189

[56] References Cited

U.S. PATENT DOCUMENTS

| 2,595,510 | 5/1952 | Burnett et al. | 179/6.3 MA |
| 3,199,226 | 9/1961 | Joslow | 369/30 X |
| 3,718,906 | 2/1973 | Lightner | 340/147 R |
| 3,729,581 | 4/1973 | Anderson | 178/6.8 |

FOREIGN PATENT DOCUMENTS 2172142  9/1973  France .
2410863  8/1977  France .
2038147  7/1980  United Kingdom .

OTHER PUBLICATIONS

Funkschau, "Trotz veränderter Geschwindigkeit: Gleiche Tonhöhe", 1977, pp. 847–851, vol. 49, No. 18.

*Primary Examiner*—Robert L. Richardson
*Attorney, Agent, or Firm*—Oblon, Fisher, Spivak, McClelland & Maier

[57] ABSTRACT

A process and system for vending recorded information, wherein a recording of information is carried out at a faster speed than normal. Calls from subscribers are received and a message is formed consisting of a preamble constituted by an addressing code to the requesting subscriber, a message body constituted by the information corresponding to requested information and an end of message. Said message is transmitted to the requesting subscriber by means of a picture transmission channel. In an equipment housed with the requesting subscriber the addressing code is recognized and the transmitted message body is received. The read message is then decelerated in order to give it its normal speed again and restoring the corresponding information on the basis of the decelerated message.

9 Claims, 2 Drawing Figures

PROCESS FOR THE TELEDISTRIBUTION OF RECORDED INFORMATION AND A SYSTEM FOR PERFORMING THIS PROCESS

BACKGROUND OF THE INVENTION

The present invention relates to a process for the teledistribution or remote distribution of recorded information or data and to a system for performing this process.

The scope of the application relates to the teledistribution of musical works, such as read literature works (novels, short stories, essays, plays, etc.), musical works with commentaries, literary works read with background effects, news, courses, conferences, etc. However, the preferred sphere of application is in the teledistribution of recorded musical works. Thus, although this is in no way limitative, it is the example which will be referred to hereinafter.

Listening to recorded music essentially involves the use of disks and cassettes. By their very nature, these means make it necessary for the music lover to previously acquire a recording from a shop. Thus, the desire to listen to a particular work can only be satisfied with a time lag.

This naturally does not apply to recordings already in one's possession, but, despite the interest of acquiring a record library, difficulties are encountered, as is known by all music lovers. Apart from the high cost of a collection of this type, certain recordings deteriorate to such an extent that they become inaudible and in other cases interest in a particular recording is quickly lost and it is consequently not played. Thus, it merely encumbers the record library so that the latter, despite its size, does not always provide complete satisfaction.

Moreover, certain recordings have become so rare that only the minority who acquired them in time, either by taste, or by design, can listen to them. Thus, these musical works are unavailable to the general public, which cuts down the choice of available musical recordings.

In spite of the quality of music broadcast by radio or television, it must be accepted that it does not always correspond to the listener's taste or his wishes at a particular moment.

Thus, there is a real need for a distribution system for musical works, which obviates the aforementioned disadvantages, i.e. which is able to make almost instantaneously available to the music lover the musical work of his choice.

There would appear to be no solution to this problem. Thus, listening to a musical work presupposes the possession of a recording and the latter can only be obtained in two ways, by acquiring a previously recorded support, or by recording it on a tape recorder. In both cases, there is a necessary delay. In the case of recording the work, the delay is short, but is at least as long as the duration of the work. This delay can be an hour or more in the case of operas, symphonies, etc. It would therefore appear to be impossible to reduce this delay.

BRIEF SUMMARY OF THE INVENTION

The object of the invention is to solve this problem by proposing a process and a system offering, to requesting users, any piece of music of their choice (or any of the information referred to hereinbefore) and in a few seconds.

The invention is based on data processing considerations, which will be summarized in the following way. The information flow rate linked with classical music is approximately 0.5 Mbits/s. However, the information flow rate of picture transmission channels used in television (either broadcast, or by optical fibres or cable) is well above this value, being about 100 Mbits/s, or 140 Mbits/s in the case of optical fibres. Thus, in a transmission channel of this type, it is possible to transmit information relative to music comparessed in a factor of 200. This means that a musical work lasting one hour can be transmitted in 18 seconds. For half the compression factor (100), the content of the two sides of a normal disk of in each case 20 minutes, can be transmitted in 24 seconds.

Thus, the invention advocates a novel application of means for the transmission of pictures at high speed to the transmission of the sound corresponding to previously recorded works in an accelerated manner. The recording of the sound transmitted under these conditions must take place on an apparatus generally suitable for recording picture signals, i.e. on an apparatus of the video recorder type. The rereading of this recording must be accompanied by a rate conversion of the information flow, so that the work is obtained at its normal speed.

Thus, the message involved in this type of transmission is of a new type with respect to its significance, because it carries sound information. However, from the structural standpoint it involves conventional digital or analog signal, constituted by an addressing preamble making it possible to select the user or subscriber who has made the request, the body of the message corresponding to the chosen musical work, and an end of message informing the user of the end of the recording procedure.

It is pointed out that the invention uses means, which, considered in isolation are in part known because they consist of telematic networks and recording means. However, these means must be adapted to the problem to be solved (compression of the recording at the source, constitution of an appropriate message, as expansion of the recording received). However, these means are essentially tried and tested and one of the advantages of the invention is that it does not necessitate the use of complicated means and instead uses, after slight adaptation, already existing installations.

More specifically the present invention relates to a process for the teledistribution of recorded information, wherein it comprises forming an information recording bank, recording being carried out at a faster speed than normal, receiving and identifying calls from subscribers requesting a particular work, forming a message consisting of a preamble constituted by an addressing code to the requesting subscriber, a message body constituted by the information corresponding to requested information and an end of message, transmitting to the requesting subscriber the said message by means of a transmission channel, the recognition, in equipment housed with the requesting subscriber, of the addressing code of said equipment and, in the case of the reception of this code, recording the transmitted message body, after reception of the end of message, reading the recorded message and decelerating the read message in order to give it its normal speed again and restoring the corresponding information on the basis of the decelerated message.

The message can be transmitted in either analog or digital manner.

The invention also relates to a system for the teledistribution of recorded information for performing the process as defined hereinbefore. This system comprises:

(a) a distribution centre comprising an information recording bank, the information being recorded at a faster speed than normal, means for forming a message comprising a preamble constituted by an addressing code to the requesting subscriber, a message body corresponding to the selected information and an end of message;

(b) each subscriber equipment comprises an indicating circuit able to recognize the arrival of its own addressing code and an end of message, a video recorder controlled by the indicating circuit, a decelerator connected to the video recorder and able to restore the normal speed to the information and a sound restoration chain connected to the rate converter;

(c) a transmission channel able to transmit information from the distribution centre to each subscriber equipment;

(d) and a telephone network connecting subscribers to the distribution centre.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
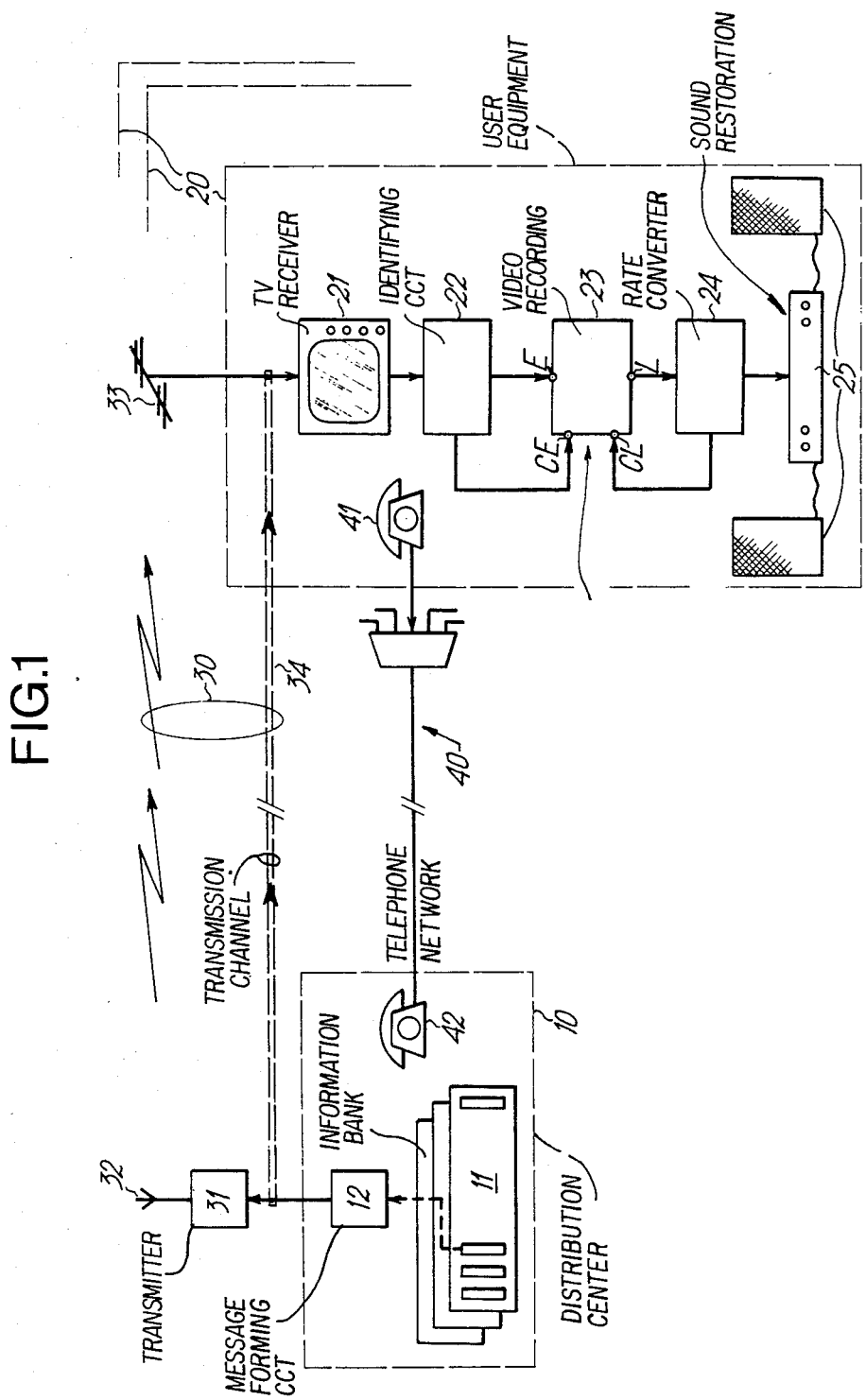
FIG. 1 a general diagram of a system according to the invention.

The system shown in FIG. 1 comprises in a general manner, a distribution centre 10, user equipment 20, a transmission channel 30 and a telephone network 40.

In a more detailed manner, the distribution centre 10 comprises a bank 11 of musical recordings recorded at a faster speed than normal (100 to 200 times faster). The recording support can be a video disk or a video recorder. The compression of the sound information can be obtained by writing into a memory and then reading from the memory at the accelerated speed. This processing takes place on a single occasion only for each work in the collection. The distribution centre 10 also comprises means 12 for forming a broad band, high flow rate message comprising a preamble constituted by an addressing code corresponding to the requesting subscriber, a body of a message corresponding to the selected work and an end of message. To these essential components can be added the signals normally encountered in transmission (sync pulses, error correcting codes, etc.).

Each user equipment 20 comprises a television receiver 21, an indicating circuit 22 able to recognize the arrival of the code and the end of the message, a video recorder 23 controlled by indicating circuit 22, a rate recorder 24 connected to the video recorder and able to restore the normal speed to the information and finally a sound restoration chain 25 connected to the rate converter.

Video recorder 23 comprises a writing input E, a reading output L, a writing control input CE and a reading control input CL. The writing input and the writing control input are connected to the indicating circuit 23, whilst the reading output and the reading control input are connected to rate converter 24.

Transmission channel 30 is able to transmit data from the distribution centre 10 to each of the subscriber equipment 20. The flow rate is at least 50 Mbits/s. It can comprise broadcasting means consisting of a transmitter 31, a transmitting antenna 32, a receiving antenna 33, or a cable or optical fibres 34. In the case of these means, the flow rate is approximately 100 Mbits/s.

The telephone network 40 connects the subscribers to the distribution centre. Each subscriber has a hand set 41 connected to a telephone line connecting him with a central station 42 located in centre 10.

The operation of this system results from what has been stated hereinbefore. The user wishing to listen to a work belonging to the collection recorded in the centre 10 supplies the latter with the references of the chosen work by means of the telephone line. He also provides his identity, either by his name and address, or by a numerical code. Centre 10 selects the chosen work, reads it and transmits a message preceded by the addressing code of the subscriber. The reception of the addressing code in equipment 20 enables the indicating circuit 22 to form a writing control instruction for video recorder 23. The information received by equipment 20 is then transmitted to magnetoscope 24, where it is recorded at the fast speed.

The writing phase continues until the work has been completely recorded. However, as stated hereinbefore, this phase is of a short duration, in view of the high compression level of the recorder information (greater than 100).

When the complete work has been transmitted, by means of circuit 12, centre 10 transmits an end of message code, which is recognized by circuit 22, which then stops the video recorder 23. An indicator can inform the subscriber that listening can start.

The recording can be kept on the video recorder for the purpose of listening to it later, but it is also possible to erase the recording, by reverse operation of the recording tape. It is also possible to erase all the messages preceding the final recording received.

The question of the addressing of the message can be solved in any known manner. It is possible to use a binary code characteristic of each subscriber. The identification circuit 23 then comprises a binary comparator able to recognize the arrival of a predetermined number. Such a comparator can operate on a bit-by-bit basis and has the same number of logic AND gates as the code has bits, each gate receiving on the one hand a given bit of the code and on the other the same significance bit of the word received. The outputs of these gates are connected to a supplementary logic AND gate, whose output indicates whether the expected code has been received. However, other circuits are possible, e.g. shift registers formed by flip-flops, whose direct or reverse outputs are precabled to an adder as a function of the expected code.

The addressing code can also use analog means, such as frequency combinations, of the type found in telephone number dialing.

The use of an addressing code is obviously useful for ensuring that the information arrives at the correct destination, but also has the advantage of permitting a delayed transmission of the message. Thus, for various reasons, the recording can be delayed (saturation of the centre, recorder occupied, etc.). The use of an addressing code controlling the starting of recording obviates the need for the subscriber to be present for receiving the message.

The transmission of the information can take place in analog manner for broadcasting systems and cabled networks, but also in digital manner in the case of the latter.

Figure 2:
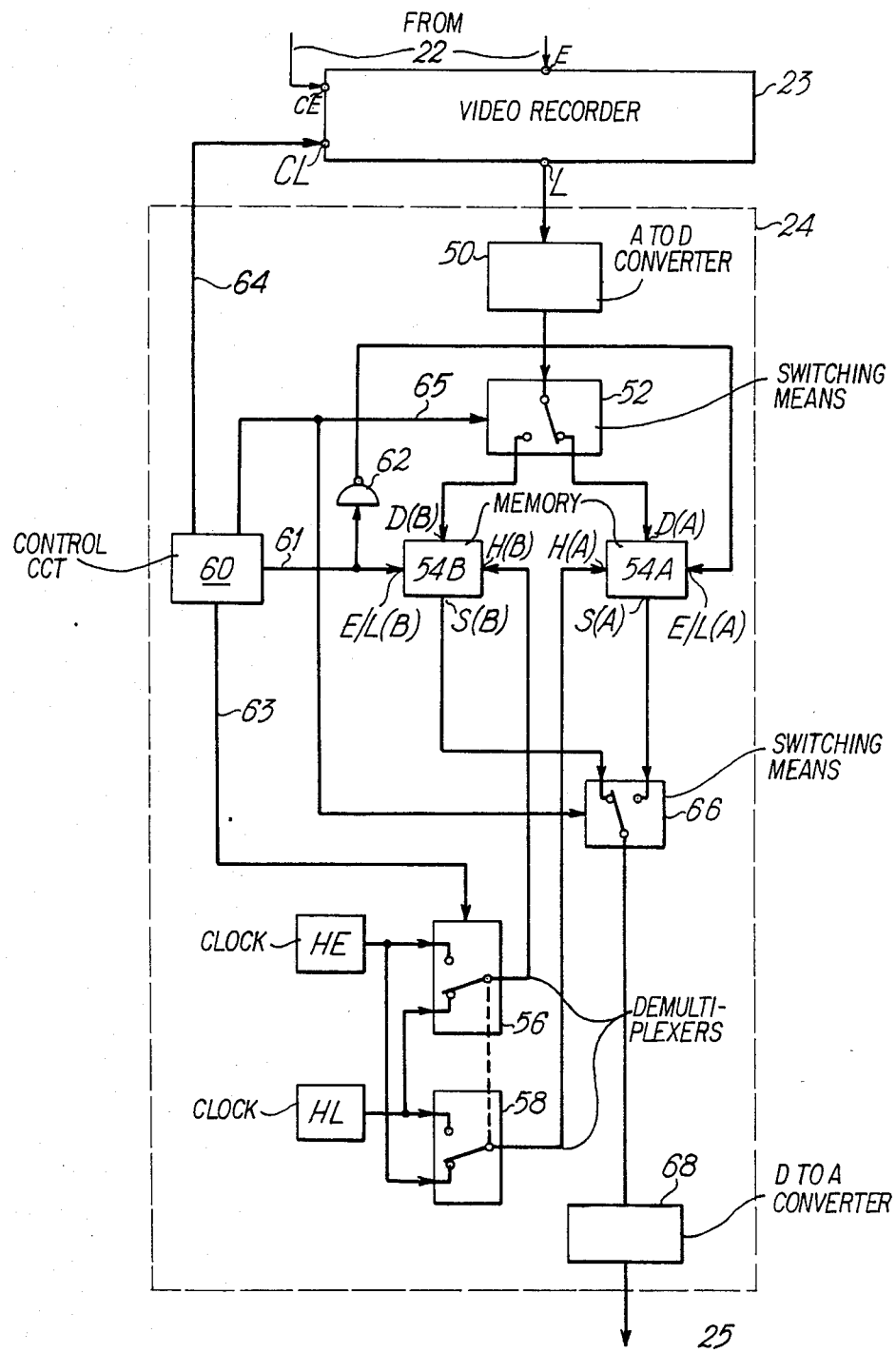
FIG. 2 a diagram of a rate converter.

An example of a rate converter which can be used according to the invention is diagrammatically illustrated in FIG. 2. As shown, this apparatus comprises an analog-digital converter 50 (naturally unless magnetoscope 23 operates digitally); an input switching means 52 with an input connected to converter 50 and with two outputs; two memory stacks 54A, 54B, each stack comprising a data input respectively D(A) and D(B), connected to the two outputs of switching means 52, a control input of the operating mode (reading and writing) respectively E/L(A) and E/L(B), a timing signal input respectively H(A) and H(B) and an output S(A) and S(B); two clocks HE and HL, the second having a frequency well below that of the first, the frequency ratio being equal to the degree of information compression in the transmission centre (e.g. 200); two demultiplexers 56, 58 having two inputs connected to the clocks and one output, the outputs of these two demultiplexers being connected to inputs H(A) and H(B) of the two memories, these demultiplexers working in alternating mode (i.e. when one has its output connected to the writing clock HE, the other has its output connected to the reading clock HL); a control circuit 60 supplying by means of a connection 61, a control instruction of the operating mode, said connection being directly connected to the control input E/L(B) of memory 54B and via a NO gate 62 to input E/L(A) of memory 54A, by a connection 63 a control instruction to demultiplexers 56, 58, by a connection 64 a reading control instruction to magnetoscope 23 and finally, by a connection 65 a control instruction for switching means 52.

The represented rate converter also comprises an output switching means 66 with two inputs connected to the two outputs S(A) and S(B) of the memories and one output, said switching means 66 being controlled by circuit 60 in the same way as switching means 52, but in opposition. Finally, it comprises a digital-analog converter 68 connected to switching means 66, naturally unless the chain does not function digitally.

The rate converter functions in the following manner. Circuit 60 controls the reading, segment by segment, of the track recorded on video recorder 23. When a segment is written into one of these memory stacks, the preceding segment is read into the other stack. For this purpose, switching means 52 is brought into the position connecting one of the inputs of the stack, e.g. input D(A) of block 54A to the output L of the video recorder. Stack 54A is controlled in writing and stack 54B in reading. Switching means 66 connect output S(B) of stack 54B to converter 68.

Writing into stack 54A takes place at the speed of clock HE and reading into block 54B at the speed of clock HL. It is naturally the reading of stack 54B which requires most time, because the ratio of the frequencies of clocks HE and HL are in the ratio of the degree of compression of the information. The writing of a segment into stack 54A is consequently completed well before the reading of the preceding segment into block 54B. When the reading is completed, circuit 60 switches switching means 52, which then connects memory stack 54B to the recorder and switches switching means 66, which then connects converter 68 to stack 54A. Circuit 60 also controls stack 54B in writing and stack 54A in reading and switches demultiplexers 56, 58, which then address respectively reading and writing clock pulses to stacks 54A and 54B. In this way a new information segment can be read into the video recorder.

Thus, the video recorder can advance in a stepped manner. Thus, for example, it can operate on the basis of reading successive fixed pictures. The control is obtained by circuit 60, which supplies appropriate instructions by connection 64. It is known that a video recorder conventionally records pictures, each containing approximately 5 Mbits of information. In the present case, the information corresponds to a sound signal and not to a visual signal, which changes nothing from the information processing standpoint. If each "picture" is broken down into ten segments, each segment corresponds to 500 kbits of information. Each of the memory stacks 54A and 54B must have this capacity. In practice, it would be possible to use two memories having 256 kbits. A complete picture corresponding to 1/25 seconds of recording and with a degree of compression of 200, a complete picture corresponds to (200)/(25)=8 seconds of sound and a segment of 1/10 of a picture to 0.8 s of sound. This is the switching period of the writing and reading phases in the rated converter.

Naturally the numerical values given hereinbefore are only intended as examples for illustrating the operation of the system.

What is claimed is:

1. A process for the remote distribution of recorded information corresponding to sound, said recorded information having a normal speed, wherein it comprises the steps of:
   forming an information recording bank, recording being carried out at a speed at least 100 times faster than said normal speed, receiving and identifying calls from subscribers requesting a particular work, forming a message consisting of a preamble constituted by an addressing code to the requesting subscriber, a message body constituted by the information corresponding to requested information and an end of message, transmitting to the requesting subscriber the said message by means of a picture transmission channel having an information flow rate of at least 50 Mbits/s,
   recognizing, in equipment housed with the requesting subscriber, the addressing code of said equipment and, in the case of the reception of this code, recording the transmitted message body, after reception of the end of message, reading the recorded message and decelerating the read message in order to give it its normal speed again and restoring the corresponding information on the basis of the decelerated message.

2. A process according to claim 1, wherein the transmission of the message takes place in analog manner.

3. A process according to claim 1, wherein the transmission of the message takes place in digital manner.

4. A process according to claims 1, 2 or 3, wherein the information consists of musical works.

5. A system for the teledistribution of recorded information, comprising:
   a distribution centre comprising an information recording bank, having information corresponding to sound, said recorded information being recorded at a speed at least 100 times faster than normal,
   means for forming a message comprising a preamble constituted by an addressing code to the requesting subscriber, a message body corresponding to the selected information and an end of message;

each subscriber equipment comprises an indicating circuit able to recognize the arrival of its own addressing code and an end of message, a video recorder controlled by the indicating circuit, a connected to said video recorder and able to restore the normal speed to the information and a sound restoration chain connected to said rate converter, a picture transmission channel having an information flow rate of at least 50 Mbits/s able to transmit information from the distribution centre to each subscriber equipment; and a means for connecting subscribers to the distribution centre via a telephone network.

6. A system according to claim 5, wherein the transmission channel is a colour television broadcasting network.

7. A system according to claim 5, wherein the transmission channel is a cabled network.

8. A system according to claim 5, wherein the rate converter comprises a memory subdivided into two stacks alternately operating on a reading basis is one case and on a writing basis in the other and two clocks each controlling the two stacks, one in writing with a first frequency and the other in reading with a second frequency which is lower than the first, an input switching means having an input connected to the video recorder and two outputs connected to the two memory stacks, an output switching means with two inputs connected to the two memory stacks and one output.

9. A system according to claim 5, wherein the recordings are of musical works.

* * * * *